(12) United States Patent  (10) Patent No.: US 7,864,393 B2
Uchigaki et al.  (45) Date of Patent: Jan. 4, 2011

(54) OPTICAL SCANNING ELEMENT, OPTICAL SCANNING DEVICE, OPTICAL SCANNING DISPLAY DEVICE, AND RETINAL SCANNING DISPLAY

(75) Inventors: Tomoyoshi Uchigaki, Nagoya (JP); Isao Tomida, Suzuka (JP)

(73) Assignee: Brother Kogyo Kabushiki, Nagoya (JP)

( * ) Notice: Subject to any disclaimer, the term of this patent is extended or adjusted under 35 U.S.C. 154(b) by 125 days.

(21) Appl. No.: 12/382,551

(22) Filed: Mar. 18, 2009

(65) Prior Publication Data

US 2009/0185254 A1  Jul. 23, 2009

Related U.S. Application Data

(63) Continuation-in-part of application No. PCT/JP2007/068109, filed on Sep. 19, 2007.

(30) Foreign Application Priority Data

Sep. 28, 2006  (JP) .............................. 2006-266123

(51) Int. Cl.
G02B 26/08 (2006.01)
(52) U.S. Cl. ................ 359/224.1; 359/199.1; 359/224.2
(58) Field of Classification Search .............. 359/199.1, 359/199.4, 200.8, 213.1–215.1, 224.1–224.2; 310/311
See application file for complete search history.

(56) References Cited

U.S. PATENT DOCUMENTS 6,049,407 A * 4/2000 Melville .................. 359/198.1

6,198,565 B1  3/2001 Iseki et al.
2005/0063038 A1  3/2005 Filhol

FOREIGN PATENT DOCUMENTS

| EP | 1 519 213 A1 | 3/2005 |
|---|---|---|
| FR | 2 859 542 A2 | 3/2005 |
| JP | A 9-101474 | 4/1997 |
| JP | A 2000-214407 | 8/2000 |
| JP | A 2001-75042 | 3/2001 |
| JP | A 2002-287075 | 10/2002 |
| JP | A 2003-57586 | 2/2003 |
| JP | A 2005-122131 | 5/2005 |
| JP | A 2005-148459 | 6/2005 |
| JP | A 2006-215201 | 8/2006 |
| WO | WO 2006/082827 A1 | 8/2006 |

* cited by examiner

*Primary Examiner*—James Phan
(74) *Attorney, Agent, or Firm*—Oliff & Berridge, PLC

(57) ABSTRACT

An optical scanning element includes: a first member which is constituted of a mirror portion, a mirror supporting portion and a frame portion; a second member which fixes and holds the frame portion of the first member thereon; and a piezoelectric body. The frame portion includes a beam portion and fixing portions which are positioned at both ends of the beam portion, the mirror supporting portion is connected to the beam portion at a connection point, and the piezoelectric body is fixedly mounted on the frame portion in a state that the piezoelectric body extends toward the connection point of the beam portion from the fixing portion to a position not over the connection point thus extending over the beam portion and the fixing portion. Due to such constitution, a swinging angle of the mirror portion can be increased thus enlarging a scanning angle.

11 Claims, 11 Drawing Sheets

Fig. 5

| EXPERIMENT No | No1 | No2 | No3 | No4 | No5 | No6 |
|---|---|---|---|---|---|---|
| L (mm) | 5 | 5 | 5 | 5 | 5 | 5 |
| P1 (mm) | 1.5 | 1.5 | 1.5 | 1.5 | 1.5 | 1.5 |
| P2 (mm) | 2.5 | 3.75 | 4 | 1.25 | 1 | 4.5 |
| P1/P2 | 0.6 | 0.4 | 0.38 | 1.2 | 1.5 | 0.33 |
| P2/L | 0.50 | 0.75 | 0.80 | 0.25 | 0.20 | 0.90 |
| OSCILLATION WIDTH (mm) | 190 | 187 | 151 | 54 | 33 | UNSTABLE |
| OPTICAL OSCILLATION ANGLE (°) | 41.6 | 41 | 33.6 | 12.3 | 7.6 | *** |

Fig. 6

| EXPERIMENT No | No7 | No8 | No1 | No9 |
|---|---|---|---|---|
| L (mm) | 5 | 5 | 5 | 5 |
| P1 (mm) | 0 | 0.5 | 1.5 | 2 |
| P2 (mm) | 2.5 | 2.5 | 2.5 | 2.5 |
| P1/P2 | 0 | 0.2 | 0.6 | 0.8 |
| P2/L | 0.50 | 0.50 | 0.50 | 0.50 |
| OSCILLATION WIDTH (mm) | 62 | 172 | 190 | 188 |
| OPTICAL OSCILLATION ANGLE (°) | 14.1 | 38 | 41.6 | 41.2 |

Fig. 7

| EXPERIMENT No | No10 | No11 | No12 | No1 | No13 | No14 | No15 | No16 |
|---|---|---|---|---|---|---|---|---|
| L (mm) | 5 | 5 | 5 | 5 | 5 | 5 | 5 | 5 |
| P2 (mm) | 1.5 | 2.5 | 2.5 | 2.5 | 1.5 | 1.5 | 1.5 | 1.5 |
| WIDTH OF PIEZOELECTRIC BODY (mm) | 0.5 | 0.5 | 1 | 1.8 | 2 | 2 | 2 | 2 |
| P2 AREA OCCUPATION RATIO (%) | 7.5 | 12.5 | 25.0 | 45.0 | 60.0 | 75.0 | 80.0 | 90.0 |
| OSCILLATION WIDTH (mm) | 23 | 25 | 44 | 190 | 180 | 165 | 135 | UNSTABLE |
| OPTICAL OSCILLATION ANGLE (°) | 5.3 | 5.7 | 10.1 | 41.6 | 39.6 | 36.5 | 30.2 | *** |
|  | SMALL AREA | SMALL AREA | SMALL AREA |  |  |  |  | P2 EXCESSIVELY LARGE |

Fig. 8

| EXPERIMENT No | No17 | No1 | No18 | No19 | No20 | No21 | No22 | No23 |
|---|---|---|---|---|---|---|---|---|
| L (mm) | 5 | 5 | 5 | 5 | 5 | 5 | 5 | 5 |
| P2 (mm) | 2.5 | 2.5 | 2.5 | 2.5 | 2.5 | 2.5 | 2.5 | 2.5 |
| THICKNESS OF MEMBER A (mm) | 0.02 | 0.05 | 0.3 | 0.4 | 0.05 | 0.05 | 0.05 | 0.05 |
| THICKNESS OF PIEZOELECTRIC BODY (mm) | 0.15 | 0.15 | 0.15 | 0.15 | 0.20 | 0.30 | 0.50 | 0.70 |
| OSCILLATION WIDTH (mm) | 195 | 190 | 110 | *** | 133 | 105 | 100 | *** |
| OPTICAL OSCILLATION ANGLE (°) | 42.6 | 41.6 | 24.8 | NOT DRIVEN — THICKNESS OF MEMBER EXCESSIVELY LARGE | 29.8 | 23.7 | 30.2 | NOT DRIVEN — THICKNESS OF PIEZOELECTRIC MEMBER EXCESSIVELY LARGE |

Fig. 9

| EXPERIMENT No | No1 | No24 | No25 |
|---|---|---|---|
| L (mm) | 5 | 8 | 12 |
| P1 (mm) | 1.5 | 1.5 | 3 |
| P2 (mm) | 2.5 | 6 | 7 |
| P1/P2 | 0.60 | 0.25 | 0.43 |
| P2/L | 0.50 | 0.75 | 0.58 |
| OSCILLATION WIDTH (mm) | 190 | 195 | 220 |
| OPTICAL OSCILLATION ANGLE (°) | 41.6 | 42.6 | 47.5 |

OPTICAL SCANNING ELEMENT, OPTICAL SCANNING DEVICE, OPTICAL SCANNING DISPLAY DEVICE, AND RETINAL SCANNING DISPLAY

CROSS-REFERENCE TO RELATED APPLICATIONS

The present application is a Continuation-in-Part of International Application PCT/JP2007/068109 filed on Sep. 19, 2007, which claims the benefits of Japanese Patent Application No. 2006-266123 filed Sep. 28, 2006.

BACKGROUND

1. Field

The present invention relates to an optical scanning element for an optical scanner used in a laser printer or a projection-type display device. The present invention particularly relates to an optical scanning element which swings a reflection mirror by oscillating an oscillating body.

2. Description of the Related Art

Conventionally, there has been known an optical scanning element which forms a projection image by scanning laser beams which are modulated in response to image signals in a projection-type display device or the like. For example, a rotary multi-face mirror (polygon mirror) or an oscillation-drive-type reflection mirror (Galvano mirror) has been used. Out of these mirrors, the oscillation-drive-type reflection mirror can miniaturize a drive part compared to the rotary multi-face mirror and hence, the oscillation-drive-type reflection mirror is preferably applicable to a light-weighted and miniaturized optical scanning element.

FIG. 16 is an exploded perspective view showing a Galvano-mirror-type optical scanning element 100 described in JP-A-2003-57586 (patent document 1). An oscillating body 103 is mounted on a base frame 101 by way of support portions 102 which are formed on both sides of the base frame 101. The oscillating body 103 is a unitary body constituted of a reflection mirror portion 105, a fixed frame 104 which is formed around the reflection mirror portion 105, and torsional spring portions 106 which connect the reflection mirror portion 105 and the fixed frame 104 and support the reflection mirror portion 105 from both sides. The torsional spring portions 106 are formed along an axis which passes the center of gravity of the reflection mirror portion 105, and constitute rotary shafts for the torsional rotation of the reflection mirror portion 105.

A pair of fixed electrodes 107, 108 is mounted on the base frame 101 at positions where the fixed electrodes 107, 108 face the reflection mirror portion 105 in an opposed manner. A voltage is applied between the oscillating body 103 and the pair of fixed electrodes 107, 108. Here, the voltage is alternately applied using a changeover switch SW. Due to such an application of the voltage, an electrostatic force acts between the fixed electrodes 107, 108 and the reflection mirror portion 105 so as to allow the fixed electrodes 107, 108 and the reflection mirror portion 105 to attract each other. By alternately applying the voltage to the pair of fixed electrodes 107, 108, the reflection mirror portion 105 is swung using the torsional spring portions 106 as a rotation axis.

FIG. 17 is a conceptual view of a projection-type display device in which the optical scanning element 100 scans a reflection optical flux 112 formed by reflection of an incident light, and projects the reflection optical flux 112 on a screen 113. The optical flux 111 radiated from a light source 110 with image modulation is radiated to the reflection mirror portion 105 of the optical scanning element 100. Since the reflection mirror portion 105 is swung, the reflection optical flux 112 oscillates vertically thus drawing a vertical trajectory on the screen 113. For example, in a state that the image modulated optical flux 111 from the light source 110 is subject to horizontal scanning in synchronism with a horizontal scanning period of image data contained in the optical flux 111, by swinging the reflection mirror portion 105 in synchronism with the vertical scanning period of the above-mentioned image, an image can be displayed on the screen 113.

SUMMARY

In the above-mentioned conventional method disclosed in patent document 1, for swinging the reflection mirror portion 105, the electrostatic force is utilized by applying the voltage between the reflection mirror portion 105 and the fixed electrodes 107, 108 mounted on the base frame 101. However, the electrostatic force is inversely proportional to a square of distance between the electrodes and hence, it is necessary to decrease the distance between the reflection mirror portion 105 and the fixed electrodes 107, 108. As a result, it is difficult for the reflection mirror portion 105 to acquire a large oscillation angle.

According to a first aspect of the present invention, there is provided an optical scanning element which is configured to scan an incident optical flux by a swingable reflection surface, the optical scanning element including: a first member which is constituted of a mirror portion which has the reflection surface, a mirror supporting portion which is connected to the mirror portion and forms a swing axis which is configured to allow the mirror portion to generate swinging thereof by a torsional displacement thereof, and a frame portion which is connected to the mirror supporting portion and is configured to allow the mirror supporting portion to generate a torsional displacement by oscillations thereof; a second member which fixes and holds the frame portion of the first member thereon; and a piezoelectric body which is fixedly mounted on the frame portion of the first member and is configured to transmit oscillations to the frame portion, wherein the frame portion includes a beam portion and fixing portions which are positioned at both ends of the beam portion, the mirror supporting portion is connected to the beam portion at a connection point, the frame portion is fixed to the second member at the fixing portions, and the piezoelectric body is fixedly mounted on the frame portion in a state that the piezoelectric body extends toward the connection point of the beam portion from the fixing portion to a position not over the connection point thus extending over the beam portion and the fixing portion.

According to a second aspect of the present invention, there is provided an optical scanning device including the above-mentioned optical scanning element and being configured to scan an optical flux modulated in response to an image signal by the optical scanning element.

According to a third aspect of the present invention, there is provided an optical scanning display device including the above-mentioned optical scanning element and being configured to scan an optical flux modulated in response to an image signal by the optical scanning element so as to perform a projection.

According to a fourth aspect of the present invention, there is provided a retinal scanning display including an optical scanning element and being configured to scan an optical flux modulated in response to an image signal by the optical scanning element so as to perform a display projection on a retina.

BRIEF DESCRIPTION OF THE DRAWINGS

FIG. 4A and FIG. 4B are views showing the optical scanning element of still another embodiment according to the present invention, wherein FIG. 4A is a top plan view and FIG. 4B is a cross-sectional view taken along a line Y-Y in FIG. 4A;

FIG. 5 is a table showing a relationship between a shape and a fixing position of a piezoelectric body and an oscillation width and an optical oscillation angle of a mirror portion in the optical scanning element of the embodiment according to the present invention;

FIG. 6 is a table showing a relationship between a shape and a fixing position of a piezoelectric body and an oscillation width and an optical oscillation angle of a mirror portion in the optical scanning element of the embodiment according to the present invention;

FIG. 7 is a table showing a relationship between a shape and a fixing position of a piezoelectric body and an oscillation width and an optical oscillation angle of a mirror portion in the optical scanning element of the embodiment according to the present invention;

FIG. 8 is a table showing a relationship between a shape and a fixing position of a piezoelectric body and an oscillation width and an optical oscillation angle of a mirror portion in the optical scanning element of the embodiment according to the present invention;

FIG. 9 is a table showing a relationship between a shape and a fixing position of a piezoelectric body and an oscillation width and an optical oscillation angle of a mirror portion in the optical scanning element of the embodiment according to the present invention;

DETAILED DESCRIPTION

Figure 1:
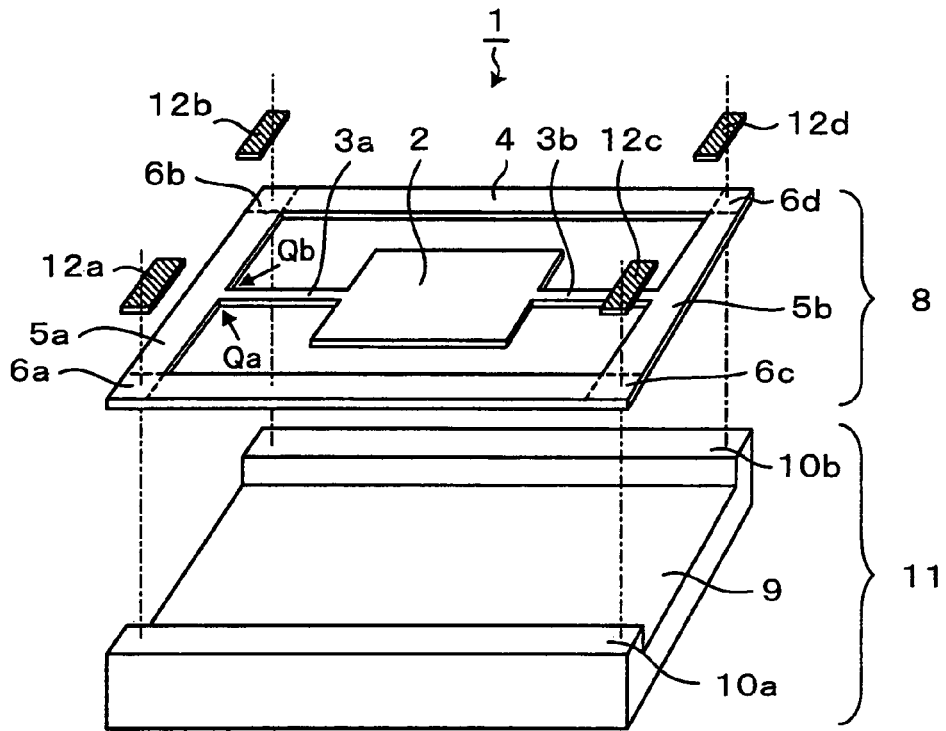
FIG. 1 is an explanatory view showing constitutional elements of an optical scanning element of an embodiment of the present invention.

An optical scanning element of this embodiment includes a first member which is constituted of a mirror portion, a mirror supporting portion which supports the mirror portion, and a frame portion which is connected to the mirror supporting portion and holds the mirror supporting portion, a second member which has projecting portions on both ends thereof and fixes the frame portion of the first member thereto at the projecting portions, and a piezoelectric body which is fixedly mounted on the frame portion of the first member. The frame portion of the first member is further constituted of a beam portion and fixing portions which are positioned at both ends of the beam portion. The mirror supporting portion is connected to the beam portion at a connection point, and the frame portion is fixed to the projecting portions of the second member at the fixing portions. The piezoelectric body is fixedly mounted on the frame portion in a state that the piezoelectric body extends toward the connection point of the beam portion from the fixing portion to a position not over the connection point of the beam portion thus extending over the beam portion and the fixing portion.

When the piezoelectric body is oscillated, the oscillations are transmitted to the beam portion and generate a torsional displacement in the mirror supporting portion which is connected to the beam portion at the connection point, and the mirror portion is swung by this torsional displacement. Here, the mirror supporting portion constitutes a swing axis of the mirror portion. Due to the swinging oscillations of the mirror portion about the swing axis of the mirror supporting portion, light which is incident on the mirror portion is served for scanning a reflection light at a cycle based on a swinging cycle.

The first member is a unitary body made of a metal material such as stainless steel or a semiconductor material such as silicon. That is, the mirror portion, the mirror supporting portion which supports the mirror portion, and the frame portion which is connected to the mirror supporting portion and generates the torsional displacement are integrally formed using the same material. Further, the mirror portion, the mirror supporting portion and the frame portion may be integrally formed using different materials. The mirror portion has a reflection surface having a surface on which light is reflected. The reflection surface may be formed of a thin film made of aluminum or silver.

The second member which fixes and holds the first member thereto is made of a metal material such as aluminum or a material such as plastic. The first member and the second member are fixed to each other by an adhesive agent. The piezoelectric body may preferably be formed using a ferroelectric material such as PZT (lead-zirconate-titanate) or barium titanate which is deformed when a voltage is applied thereto. The piezoelectric body is fixedly mounted on the frame portion of the first member by an adhesive agent or an electrically conductive adhesive agent in a state that the piezoelectric body extends over the fixing portion and the beam portion of the frame portion of the first member.

The piezoelectric body is fixedly mounted on the frame portion in a state that the piezoelectric body extends toward the connection point from the fixing portion to a position where an overlapping length of the piezoelectric body and the beam portion does not exceed 80% of a length of the beam portion between the fixing portion and the connection point thus extending over the fixing portion and the beam portion. Further, the piezoelectric body is fixedly mounted on the frame portion in a state that the piezoelectric body extends toward the connection point of the beam portion from the fixing portion to a position where an overlapping length of the piezoelectric body and the beam portion does not fall below 50% of a length of the beam portion between the fixing portion and the connection point thus extending over the beam portion and the fixing portion. The piezoelectric body may preferably be fixedly mounted on the first member in a state that the piezoelectric body extends toward the connection point from the fixing portion to a position where an overlapping length of the piezoelectric body and the beam portion falls within a range from 50% to 70% of a length of the beam portion between the fixing portion and the connection point. Further, the piezoelectric body is fixedly mounted on the beam portion in a state that an area of the overlapping length piezoelectric body and the beam portion occupies 40% to 80% of an area of the beam portion between the fixing portion and the connection point.

Further, the piezoelectric body is fixedly mounted on the frame portion while extending over the beam portion and at least one of the fixing portions positioned at both ends of the beam portion. The piezoelectric body may be fixedly mounted on two portions between the fixing portions at both ends and the beam portion. Further, when the mirror portion is supported on two mirror supporting portions, two mirror supporting portions are connected to and held on two beam portions, and fixing portions at both ends of each beam portion are fixed to the second member, three or four piezoelectric bodies may be fixedly mounted on the first member while extending over the respective fixing portions and the respective beam portions.

The optical scanning display device according to this embodiment of the present invention is constituted of a video light generation part which generates a video light, the above-mentioned optical scanning element which scans and reflects the video light incident on the optical scanning element, and an optical system which forms the scanning video light into an image. To be more specific, the video light which contains the video signal is incident on the first optical scanning element, the reflection light is horizontally scanned in synchronism with the video signal, the reflection light which is subject to the horizontal scanning is incident on the second optical scanning element, the reflection light is vertically scanned in synchronism with the video signal, and the light which is subject to the horizontal scanning and the vertical scanning is incident on the optical system thus forming an image.

Hereinafter, the present invention is explained in detail in conjunction with attached drawings.

Figure 2:
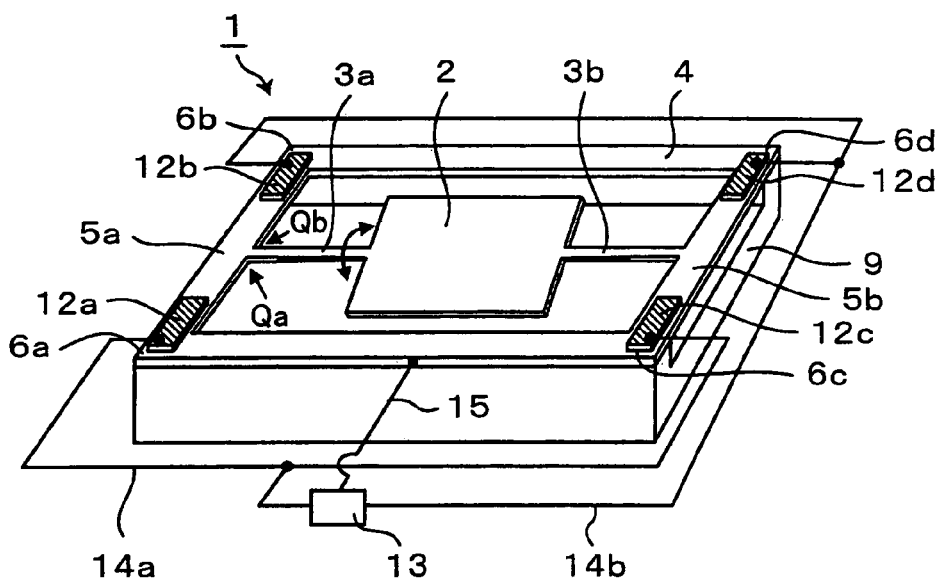
FIG. 2 is a schematic perspective view showing the optical scanning element of the embodiment according to the present invention.

FIG. 1 is a schematic exploded perspective view for explaining respective constitutional elements constituting an optical scanning element 1 according to an embodiment of the present invention. FIG. 2 is a schematic perspective view showing an optical scanning element 1 which is formed by assembling the respective constitutional elements. Identical elements or parts having identical functions are given same symbols.

In FIG. 1, the optical scanning element 1 is constituted of a first member 8, a second member 11 which fixes and holds the first member 8 thereon in a stacked manner, and first to fourth piezoelectric bodies 12a to 12d which are fixedly mounted on the four corners of the first member 8 respectively. The first member 8 is constituted of a mirror portion 2, a first mirror supporting portions 3a and a second mirror supporting portion 3b which support the mirror portion 2, and a frame portion 4 which is connected to these mirror supporting portions 3a, 3b and holds the mirror portion 2. The frame portion 4 is constituted of a first beam portion 5a and a second beam portion 5b, a first fixing portion 6a and a second fixing portion 6b which are positioned on both ends of the first beam portion 5a, a third fixing portion 6c and a fourth fixing portion 6d which are positioned on both ends of the second beam portion 5b and the like. Here, the first mirror supporting portions 3a is connected to the first beam portion 5a at connection points Qa, Qb. Usually, the first mirror supporting portions 3a is connected to an approximately center portion of the first beam portion 5a. The second mirror supporting portions 3b and the second beam portion 5b are connected with each other in the same manner as the first mirror supporting portions 3a and the first beam portion 5a.

The second member 11 is constituted of a bottom portion 9, and a first projecting portion 10a and a second projecting portion 10b which are formed on both ends of the bottom portion 9. The first member 8 and the second member 11 are fixed to each other in a stacked manner using an adhesive agent. To be more specific, the first fixing portion 6a and the third fixing portion 6c of the first member 8 and the first projecting portion 10a of the second member 11 are fixed to each other in a stacked manner using the adhesive agent, while the second fixing portion 6b and the fourth fixing portion 6d of the first member 8 and the second projecting portion 10b of the second member 11 are fixed to each other in a stacked manner using the adhesive agent.

In FIG. 2, the first piezoelectric body 12a is fixedly mounted on the frame 4 using an electrically-conductive adhesive agent in a state that the first piezoelectric body 12a extends over the first beam portion 5a and the first fixing portion 6a, while the second piezoelectric body 12b is fixedly mounted on the frame 4 using an electrically-conductive adhesive agent in a state that the second piezoelectric body 12b extends over the first beam portion 5a and the second fixing portion 6b. In the same manner, the third piezoelectric body 12c is fixedly mounted on the frame 4 using an electrically-conductive adhesive agent in a state that the third piezoelectric body 12c extends over the second beam portion 5b and the third fixing portion 6c, while the fourth piezoelectric body 12d is fixedly mounted on the frame 4 using an electrically-conductive adhesive agent in a state that the fourth piezoelectric body 12d extends over the second beam portion 5b and the fourth fixing portion 6d.

Further, an AC voltage is applied to the first piezoelectric body 12a and the third piezoelectric body 12c from the drive circuit 13 via a first line 14a, a common line 15 and the frame portion 4 made of a conductive material. In the same manner, an AC voltage having a phase opposite to a phase of the above-mentioned AC voltage is applied to the second piezoelectric body 12b and the fourth piezoelectric body 12d from the drive circuit 13 via a second line 14b, the common line 15 and the frame portion 4. The respective piezoelectric bodies 12a to 12d are oscillated with the supply of the AC voltage from the drive circuit 13 and transmit the oscillations to the first beam portion 5a and the second beam portion 5b. Due to the oscillations of the first beam portion 5a and the second beam portion 5b, a rotational torque is imparted to the first mirror supporting portion 3a and the second mirror supporting portion 3b and hence, a torsional displacement is generated in the first mirror supporting portion 3a and the second mirror supporting portion 3b whereby swinging oscillations are generated in the mirror portion 2 using the respective mirror supporting portions 3a, 3b as a swing axis. When a frequency of the swinging oscillations of the mirror portion 2 is a high frequency such as a frequency used in horizontal scanning of a display device, the swinging oscillations in the mirror portion 2 becomes a resonance frequency. The frequency of the swinging oscillations of the mirror portion 2 is determined based on a rotational moment of the mirror portion 2, a torsional modulus of the first mirror supporting portion 3a, and a torsional modulus of the second mirror supporting portion 3b using two mirror supporting portions, that is, the first mirror supporting portion 3a and the second mirror supporting portion 3b as a swing axis.

Here, in the above-mentioned embodiment, stainless steel is used as a material of the first member 8. However, the material of the first member 8 is not limited to stainless steel, and other metal, a semiconductor material such as silicon, a synthetic resin or the like may be used as a material of the first member 8. When the first member 8 is made of the synthetic resin, it is necessary to form an electrode or the like on a surface of the first member 8 on which the piezoelectric body is fixedly mounted such that the electrode or the like can be easily removed. A mirror finish may preferably be applied to a surface of the mirror portion 2, a thin film made of aluminum or silver which can reduce a reflection loss of light may preferably be stacked on the surface of the mirror portion 2, or a thin plate which can reduce a reflection loss of light may preferably be stacked on the surface of the mirror portion 2. The first to fourth piezoelectric bodies 12a, 12b, 12c and 12d are formed of a PZT piezoelectric body. However, the first to fourth piezoelectric bodies 12a, 12b, 12c and 12d are not limited to the PZT piezoelectric body and may be formed of a piezoelectric body made of barium titanate or the like. Further, although the second member 11 is made of aluminum which is a metal material, the second member 11 is not limited to aluminum, and may be made of plastic or ceramic.

Further, in the above-mentioned embodiment, four piezoelectric bodies are used. However, the number of piezoelectric bodies is not limited to four. For example, only one first piezoelectric body 12a may be fixedly mounted on the frame 4. The mirror portion 2 may be swung using two piezoelectric bodies constituted of the first piezoelectric body 12a and the second piezoelectric body 12b. Further, although the frame portion 4 is formed around the mirror portion 2 to surround the mirror portion 2, a viewer's side portion and a depth side portion of the frame portion 4 which are arranged parallel to the first mirror supporting portion 3a and the second mirror supporting portion 3b may be removed. In this case, the frame portion 4 is constituted of only the first beam portion 5a, the first fixing portion 6a and the second fixing portion 6b which are arranged on the both ends of the first beam portion 5a, the second beam portion 5b, and the third fixing portion 6c and the fourth fixing portion 6d which are arranged on the both ends of the second beam portion 5b. Further, in the above-mentioned embodiment, the mirror portion 2 is supported on two support portions constituted of the first mirror supporting portion 3a and the second mirror supporting portion 3b. However, the mirror portion 2 may be supported in a cantilever manner on only either one of these mirror supporting portions 3a and 3b. That is, the mirror portion 2 may be supported in a cantilever manner either on the first mirror supporting portions 3a or on the second mirror supporting portions 3b.

Next, a manufacturing method of the optical scanning element 1 is explained. The first to fourth piezoelectric bodies 12a to 12d are cut out from a PZT sintered body in a bulk form by dicing, and surfaces of respective piezoelectric bodies 12a to 12d are polished so as to form PZT chips having a predetermined thickness, for example, 0.1 mm to 0.3 mm. Next, the PZT chips are heated and an electric field is applied to the PZT chips in the thickness direction so as to perform the polarization treatment of the PZT chips. The polarized PZT chips are cleaned and a gold film is stacked on one surface of the PZT chip in the thickness direction by a vacuum vapor deposition method to form one electrode of the piezoelectric body.

Stainless steel is used as a material of the first member 8. A photoresist is formed on a stainless steel plate having a predetermined thickness of, for example, 10 μm to 50 μm, and patterning is performed such that the resist remains on the frame portion 4, the first mirror supporting portion 3a, the second mirror supporting portion 3b and the mirror portion 2 using a photolithography step. Next, an etching treatment is applied to the first member 8 using an acid so as to form the frame portion 4 while leaving the stainless steel plate in a patterned region. Aluminum is used as a material of the second member 11. The second member 11 is processed so as to form the first projecting portion 10a and the second projecting portion 10b on two opposing sides thereof and a bottom portion 9 between two projecting portions 10a, 10b. Stepped portions defined between upper sides of the first and second projecting portions 10a, 10b and the bottom portion 9 are formed with a depth which is sufficient for preventing an outer periphery of the swinging mirror portion 2 from being brought into contact with the bottom portion 9. Here, the first member 8 may be formed by blanking besides the photography treatment and the etching treatment.

Next, the first to fourth piezoelectric bodies 12a to 12d are fixedly mounted on the frame 4 in a state that each piezoelectric body extends over the fixing portion and the beam portion of the frame portion 4. A conductive adhesive agent containing silver is uniformly applied to surfaces of the respective piezoelectric bodies 12a to 12d on which a gold thin film is not formed, and the respective piezoelectric bodies 12a to 12d are laminated to portions of the frame portion 4 at predetermined positions. Next, the first to fourth fixing portion 6a to 6d of the frame portion 4 and the respective corner portions of the first and second projecting portions 10a and 10b of the second member 11 are laminated to each other using a silver-containing epoxy adhesive agent. Next, these laminated first to fourth piezoelectric bodies 12a to 12d, the first member 8 and the second member 11 are transferred to a dryer (oven). In the dryer, these parts are adhered and fixed to each other while being held at a temperature of 100° C. to 150° C. for approximately 30 minutes and, after cooling, these adhered parts are taken out from the dryer. The first member 8 and the second member 11 are adhered to each other by the electrically conductive adhesive agent and hence, electrodes which drive each piezoelectric body are constituted of the metal thin film which is formed on the surface of the piezoelectric body and the frame portion 4 or the second member 11.

Here, in the above-mentioned embodiment, the first member 8 is made of stainless steel. However, the first member 8 may be made of semiconductor such as silicon or metal such as titanium, copper, nickel, tungsten or the like. Further, in the above-mentioned embodiment, the piezoelectric body is cut out from the PZT sintered body in a bulk form by dicing. However, in place of such a method, a thin-film piezoelectric body may be directly formed on the mirror portion 2 using an aerosol deposition method or a sol-gel method.

FIGS. 3A to 3D are top plan views showing other embodiments of the optical scanning element 1 of the present invention. Identical components or parts having identical functions are given same symbols.

Figure 3A:
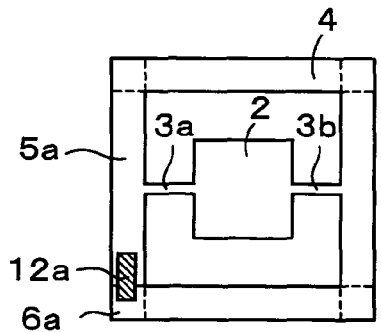
FIG. 3A to FIG. 3D are top plan views showing optical scanning elements of another embodiments according to the present invention.

FIG. 3A shows a state in which a single first piezoelectric body 12a is fixedly mounted on the frame 4 in a state that the first piezoelectric body 12a extends over the first beam portion 5a and the first fixing portion 6a of the frame portion 4. By oscillating the first beam portion 5a due to the application of an AC electric field to the first piezoelectric body 12a, a torsional displacement is generated in the first mirror supporting portions 3a and hence, swinging oscillations are generated in the mirror portion 2 using the first mirror supporting portions 3a and the second mirror supporting portions 3b as a swing axis. Due to such swinging of the mirror portion 2, reflection beams which are obtained by the reflection of beams radiated to the mirror portion 2 can be scanned at a predetermined oscillation angle.

Figure 3B:
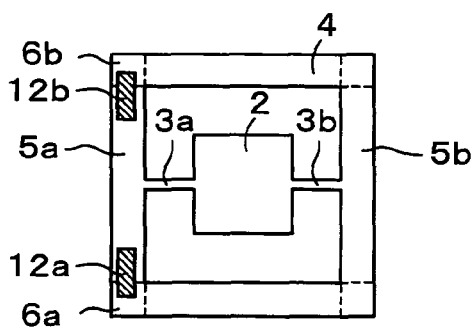
Figure 3C:
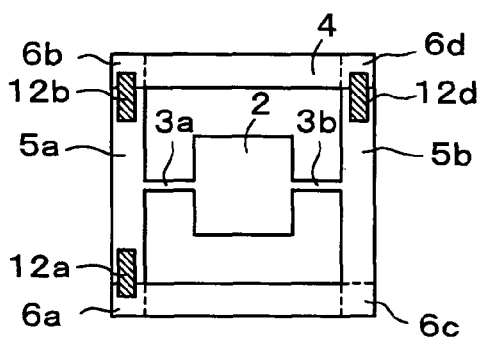

FIG. 3B shows a case in which the mirror portion 2 is swung by two piezoelectric bodies consisting of the first piezoelectric body 12a and an additional second piezoelectric body 12b. The second piezoelectric body 12b is fixedly mounted on the frame 4 in a state that the second piezoelectric body 12b extends over the second fixing portion 6b and the first beam portion 5a of the frame portion 4. Accordingly, in this embodiment, a torsional displacement is generated in the first mirror supporting portion 3a by two piezoelectric bodies 12a and 12b. This structure can swing the mirror portion 2 in a more reliable manner. FIG. 3C shows a case in which the mirror portion 2 is swung by three piezoelectric bodies. In addition to two piezoelectric bodies shown in FIG. 3B, a fourth piezoelectric body 12d is fixedly mounted on the frame 4 in a state that the fourth piezoelectric body 12d extends over the fourth fixing portion 6d and the second beam portion 5b. Further, in addition to the above-mentioned arrangements, to generate the swinging of the mirror portion 2, two piezoelectric bodies may be fixedly mounted on the frame 4 in a diagonal direction, two piezoelectric bodies may be fixedly mounted on the frame 4 in a state that two piezoelectric bodies extend over the first fixing portion 6a and the first beam portion 5a, or two piezoelectric bodies are fixedly mounted on the frame 4 in a state that two piezoelectric bodies extend over the third fixing portion 6c and the second beam portion 5b.

Figure 3D:
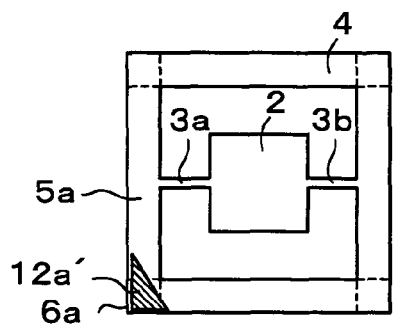

The respective piezoelectric bodies shown in FIG. 3A to FIG. 3C have a rectangular shape as viewed in a plan view. However, the shape of the piezoelectric body is not limited to such a rectangular shape. FIG. 3D is a top plan view of the optical scanning element on which a first piezoelectric body 12a' having a triangular shape is fixedly mounted on the frame 4 in a state that the first piezoelectric body 12a' extends over the first fixing portion 6a and the first beam portion 5a. Although the explanation will be made in detail later, in other words, any shape may be used as a planer shape of the piezoelectric body provided that the piezoelectric body is fixed while extending over the fixing portion and the beam portion.

Figure 4A:
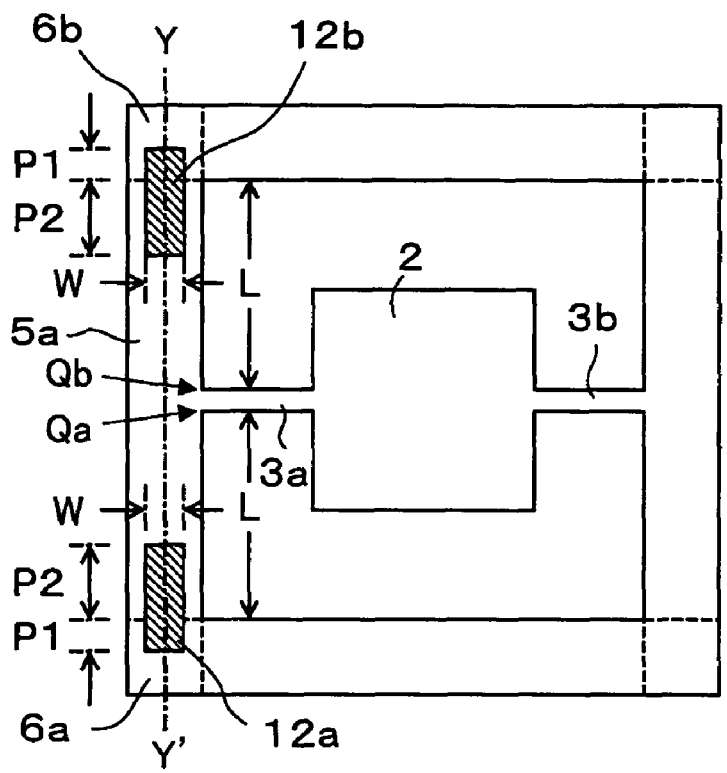
Figure 4B:
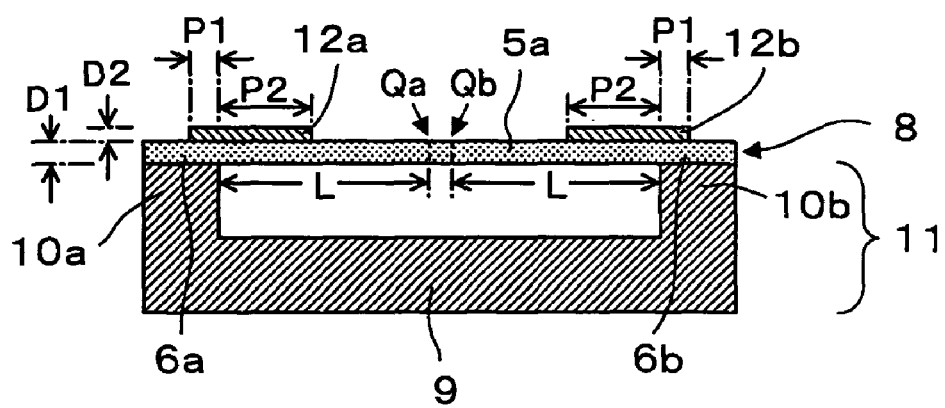

FIG. 4A and FIG. 4B show an optical scanning element 1 according to another embodiment. FIG. 4A is a top plan view of an optical scanning element 1, and FIG. 4B shows a cross-sectional view of FIG. 4A taken along a line Y-Y'. Identical components or parts having identical functions are given same symbols. Further, experiments and simulations explained hereinafter are performed based on the constitution shown in FIG. 4A and FIG. 4B.

FIG. 4A is, in the same manner as FIG. 3B, the top plan view of the optical scanning element 1 on which a first piezoelectric body 12a and a second piezoelectric body 12b are fixedly mounted on a frame portion 4 in a state that the first piezoelectric body 12a and the second piezoelectric body 12b extend over the first beam portion 5a and the first fixing portion 6a as well as over the first beam portion 5a and the second fixing portion 6b. A mirror portion 2 is supported on the first mirror supporting portion 3a and the second mirror supporting portion 3b. The first mirror supporting portion 3a is connected to the first beam portion 5a at connection points Qa and Qb. With respect to the second member 11, a first projecting portion 10a and a second projecting portion 10b are integrally fixed to a bottom portion 9 and hold the first member 8 thereon. An electrode is formed on respective front surfaces of the first piezoelectric body 12a and the second piezoelectric body 12b, and respective back surfaces of the first piezoelectric body 12a and the second piezoelectric body 12b are fixed to the first beam portion 5a, the first fixing portion 6a and the second fixing portion 6b all of which are made of an electrically conductive body using an electrically conductive adhesive agent. Accordingly, the electrodes are constituted of respective surfaces of the first piezoelectric body 12a and the second piezoelectric body 12b and the first member 8. In the explanation made hereinafter, "beam portion" is a general term which is used for collectively referring to the first beam portion 5a and the second beam portion 5b, "mirror supporting portion" is a general term which is used for collectively referring to the first mirror supporting portion 3a and the second mirror supporting portion 3b, "piezoelectric body" is a general term which is used for collectively referring to the first piezoelectric body 12a and the second piezoelectric body 12b, and "fixing portion" is a general term which is used for collectively referring to the first fixing portion 6a and the second fixing portion 6b.

The first piezoelectric body 12a and the second piezoelectric body 12b are formed of a thin rectangular plate having a length (P1+P2), a width W and a thickness D2. The first piezoelectric body 12a is fixedly mounted on the frame portion 4 in a state that the first piezoelectric body 12a extends over the first fixing portion 6a with a length P1 and extends over the first beam portion 5a with a length P2. The second piezoelectric body 12b is fixedly mounted on the frame portion 4 in a state that the second piezoelectric body 12b extends over the second fixing portion 6b with a length P1 and extends over the first beam portion 5a with a length P2. A length of the first beam portion 5a between the connection point Qa at which the first mirror supporting portion 3a and the first beam portion 5a are connected with each other and the first fixing portion 6a is set to L. In the same manner, a length of the first beam portion 5a between the connection point Qb at which the first mirror supporting portion 3a and the first beam portion 5a are connected with each other and the second fixing portion 6b is set to L. Further, the first member 8 which constitutes the fixing portion and the beam portion has a thickness D1.

FIG. 5 to FIG. 9 show results of experiments No 1 to 25 in which oscillation widths and optical oscillation angles of the mirror portion 2 are measured while changing the above-mentioned sizes P1, P2, L, D1.

FIG. 5 shows the result of the experiments on the oscillation width and the optical oscillation angle of the mirror portion 2 which are carried out under the following conditions. That is, the thickness D1 of the first piezoelectric body 12a and second piezoelectric body 12b is set to 50 μm, the length L between the connection point Qa and the first fixing portion 6a and the length L between the connection point Qb and the second fixing portion 6b are set to 5 mm, the overlapping length P1 of the first piezoelectric body 12a and the first fixing portion 6a and the overlapping length P1 of the second piezoelectric body 12b and the second fixing portion 6b are set to 1.5 mm. On the other hand, the overlapping length P2 of the first piezoelectric body 12a and the first beam portion 5a and the overlapping length P2 of the second piezoelectric body 12b and the second beam portion 5b are changed. The larger the oscillation width and the larger the oscillation angle, the larger a scanning width of optical scanning becomes. Here, the oscillation width implies amplitude of the reflected optical flux which is projected on a plane at a predetermined distance away from the mirror portion 2 when the mirror portion 2 is swung, and the optical oscillation angle implies an optical oscillation angle at such an oscillation width.

In the experiments No 1 to No 3 in FIG. 5, the oscillation width of the mirror portion 2 becomes large values which fall within a range from 190 mm to 151 mm and the optical oscillation angle of the mirror portion 2 becomes large values which fall within a range from 41.6° to 33.6°, while in the experiments No 4 to No 6, the oscillation width of the mirror portion 2 becomes 54 mm or less, or the swinging of the mirror portion 2 becomes unstable. As a result, when P2/L which is obtained by dividing the overlapping length P2 of the piezoelectric body and the beam portion by the length L between the connection point and the fixing portion is set to values which fall within a range from 0.5 to 0.8, the oscillation width and the optical oscillation angle of the mirror portion 2 become remarkably stable. Particularly, when P2/L is set to 0.9, the swinging of the mirror portion 2 becomes unstable. That is, when P2/L is set to 0.8 or more, the swinging of the mirror portion 2 rapidly becomes unstable. Further, when P2/L is set to 0.25 or less, the oscillation width and the oscillation angle of the mirror portion 2 become small and hence, it is not suitable for a practical use. Although not shown in FIG. 5, as a result of the further detailed investigation, a value of P2/L which allows the mirror portion 2 to acquire the maximum oscillation width and the maximum oscillation angle is approximately ⅔ (0.67).

FIG. 6 shows a result of experiments on the oscillation width and the optical oscillation angle of the mirror portion 2 which are carried out under the following conditions. That is, the thickness d of the first piezoelectric body 12a and the thickness d of the second piezoelectric body 12b are respectively set to 50 μm, the length L between the connection point Qa and the first fixing portion 6a and the length L between the connection point Qb and the second fixing portion 6b are respectively set to 5 mm, and the overlapping length P2 of the first piezoelectric body 12a and the first beam portion 5a and the overlapping length P2 of the second piezoelectric body 12b and the first beam portion 5a are respectively set to 2.5 mm. On the other hand, the overlapping length P1 of the first piezoelectric body 12a and the first fixing portion 6a and the overlapping length P1 of the second piezoelectric body 12b and the second fixing portion 6b are changed.

In the experiment No 7 shown in FIG. 6, P1 is set to 0 mm. In such a state, the piezoelectric body does not overlap with the fixing portion, that is, the piezoelectric body is fixedly mounted only on the beam portion. In the experiment No 7, both of the oscillation width and the optical oscillation angle of the mirror portion 2 become small, while in all of experiments No 8, No 1, No 9, the oscillation width becomes 170 mm or more and the oscillation angle becomes 38° or more. In the experiment No 7, in addition to the swinging of the mirror portion 2 generated due to the torsional oscillations of the first mirror supporting portions 3a and the second mirror supporting portions 3b, longitudinal oscillations or the like are generated in the mirror portion 2 and hence, the swinging of the mirror portion 2 becomes unstable. As a result, it is necessary to fixedly mount the piezoelectric body on the first member in a state that the piezoelectric body overlaps with the fixing portion. However, it is understood that the preferable overlapping length P1 is 0.5 mm or more.

FIG. 7 shows a result of experiments on the oscillation width and the optical oscillation angle of the mirror portion 2 which are carried out under the following conditions. That is, the thickness d of the first piezoelectric body 12a and the thickness d of the second piezoelectric body 12b are respectively set to 50 μm, and the length L between the connection point Qa and the first fixing portion 6a and the length L between connection point Qb and the second fixing portion 6b are respectively set to 5 mm. On the other hand, the widths W of the first piezoelectric body 12a and the second piezoelectric body 12b are changed within a range from 0.5 mm to 2 mm, that is, an area occupation ratio of an area of the first piezoelectric body 12a which corresponds to the length P2 (=W×2) with respect to an area of the first beam portion 5a which corresponds to the length L is changed within a range from 7.5% to 90%. The second piezoelectric body 12b has the same area occupation ratio as the first piezoelectric body 12a.

As shown in FIG. 7, in the experiments No 10 to No 12 in which the area occupation ratio of P2 is set to 25% or less, the oscillation width of the mirror portion 2 becomes 44 mm or less, the optical oscillation angle becomes 10.1° or less and hence, the optical scanning element 1 having the piezoelectric body whose area occupation ratio falls in such a range is not so useful. On the other hand, in the experiments No 1, No 13 to No 15 in which the area occupation ratio of P2 is set to values which fall within a range from 45% to 80%, the oscillation width of the mirror portion 2 becomes 135 mm or more and the optical oscillation angle becomes 30° or more and hence, it is possible to acquire the optical scanning element 1 which is highly useful in practical use. However, in the experiment No 16 in which the area occupation ratio of P2 is set to 90%, longitudinal oscillations are generated in the mirror portion 2 and hence, the swinging of the mirror portion 2 becomes unstable. Accordingly, by setting the area occupation ratio of the area of the piezoelectric body with respect to the area of the beam portion to a value which falls within a range from 40% to 80%, it is possible to acquire the optical scanning element 1 which is highly useful in practical use.

FIG. 8 shows a result of experiments on the oscillation width and the optical oscillation angle of the mirror portion 2 which are carried out under the following conditions. That is, the length L between the connection point Qa and the first fixing portion 6a and the length L between connection point Qb and the second fixing portion 6b are respectively set to 5 mm, and the length P2 between the first piezoelectric body 12a and the first beam portion 5a and the length P2 between the second piezoelectric body 12b and the first beam portion 5a are respectively set to 2.5 mm. On the other hand, the thickness D1 of the first member 8 and the thickness D2 of the first piezoelectric body and the second piezoelectric body are changed. The experiments No 17, No 1, No 18 and No 19 show the oscillation width and optical oscillation angle of the mirror portion 2 when the thickness D2 of the piezoelectric body is set to 0.15 mm and the thickness D1 of the first member 8 is changed within a range from 0.02 mm to 0.4 mm, while the experiments No 20 to No 23 show the oscillation width and optical oscillation angle of the mirror portion 2 when the thickness D1 of the first member 8 is set to 0.05 mm and the thickness D2 of the piezoelectric body is changed within a range from 0.2 mm to 0.7 mm.

From the result of the experiments No 17, No 1, No 18 and No 19 shown in FIG. 8, when the thickness D1 of the first member 8 is set to 0.3 mm or less, the oscillation width of the mirror portion 2 becomes 110 mm or more and the optical oscillation angle becomes 24.8° or more and hence, such a thickness is practical and favorable. However, when the thickness D1 of the first member 8 is set to 0.4 mm or more, the mirror portion 2 cannot be swung. Further, when the thickness of the first member 8 is set to a value less than 0.02 mm, it is difficult to perform processing for acquiring such a thickness and hence, the processing cost is pushed up. Accordingly, it is practically favorable to set the thickness D1 of the first member 8 to a value which falls within a range from 0.02 to 0.3 mm.

Further, with respect to the thickness D2 of the piezoelectric body, from the experiments No 1, No 20 to No 23, by setting the thickness D2 to 0.5 mm or less, the oscillation width of the mirror portion 2 becomes 100 mm or more and the optical oscillation angle becomes 22° or more and hence, such a thickness is practical. However, the smaller the thickness of the piezoelectric body, the more difficult the processing becomes. Further, as shown in the experiment No 23, when the thickness D2 of the piezoelectric body is set to 0.7 mm or more, the mirror portion 2 is not oscillated in a swinging manner and hence, the driving of the mirror portion 2 is difficult.

FIG. 9 shows a result of experiments on the oscillation width and the oscillation angle of the mirror portion 2 which are carried out under the following conditions. That is, the thicknesses of the first piezoelectric body 12a and the second piezoelectric body 12a are set to 50 μm, and the length L between the connection point and the fixing portion, the length P1 of the piezoelectric body at the fixing portion and the length P2 of the piezoelectric body at the beam portion are respectively changed. Compared to the experiment No 1 in which the length L between the connection point and the fixed portion is set to 5 mm, in experiments No 24 and No 25, the length L is elongated to 8 mm and 12 mm. However, in the experiment No 24, P2/L which is a value obtained by dividing the overlapping length P2 of the piezoelectric body and the beam portion by the length L between the connection point and the fixing portion is set to 0.75, and P2/L of the experiment No 25 is set to 0.58. In both cases, P2/L is set to a value which falls within a range from 0.5 to 0.8, the oscillation width of the beam portion 2 becomes 190 mm or more, and the optical oscillation angle of the beam portion 2 becomes 41° or more and hence, favorable swinging oscillations of the mirror portion 2 can be acquired.

FIG. 10 to FIG. 13 show results of simulations which are carried out for further confirming the above-mentioned experimental results. As a material of the first member 8, a material having physical properties such as Young's modulus of 197 GPa, Poisson's ratio of 0.3 and density of 8 g/cm$^3$ is used, and the thickness of the first member 8 is set to 0.05 mm. As a material of the piezoelectric body, a PZT which has physical properties of Young's modulus of 90 GPa, Poisson's ratio of 0.34, and density 70.82 g/cm$^3$ and also has a size of W×(P1+P2)×D2=1.5 mm×4.0 mm×0.15 mm is used.

Figure 10:
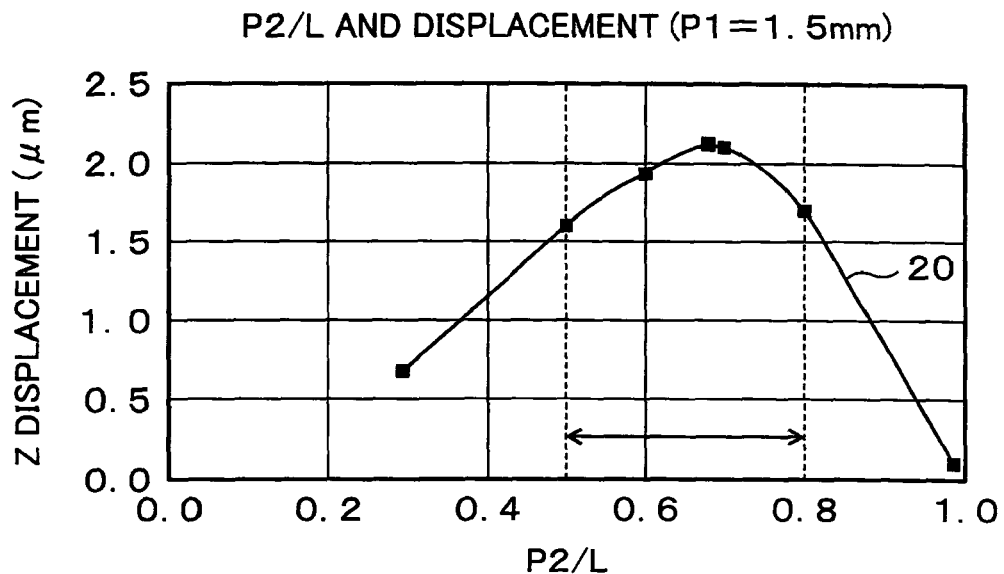
FIG. 10 is a graph showing a change of Z displacement when P2/L of the optical scanning element in the optical scanning element of the embodiment according to the present invention is changed.

FIG. 10 shows a change of the Z displacement under conditions that P1 is set to 1.5 mm, and P2/L is changed to a value which falls within a range from 0.3 to approximately 1.0 while setting L to 5 mm. P2/L is taken on an axis of abscissas and Z displacement which indicates a torsional displacement quantity is taken on an axis of ordinates. A graph 20 shown in FIG. 10 indicates that when P2/L which is acquired by dividing the length of the piezoelectric body at the beam portion by the length L from the connection point to the fixing portion is set to a value which falls within a range from 0.5 to 0.8, the Z displacement becomes 1.5 μm or more and hence, the mirror portion 2 can acquire favorable swinging. The result agrees with the results obtained in the experiments No 1 to No 6 in FIG. 5.

Figure 11:
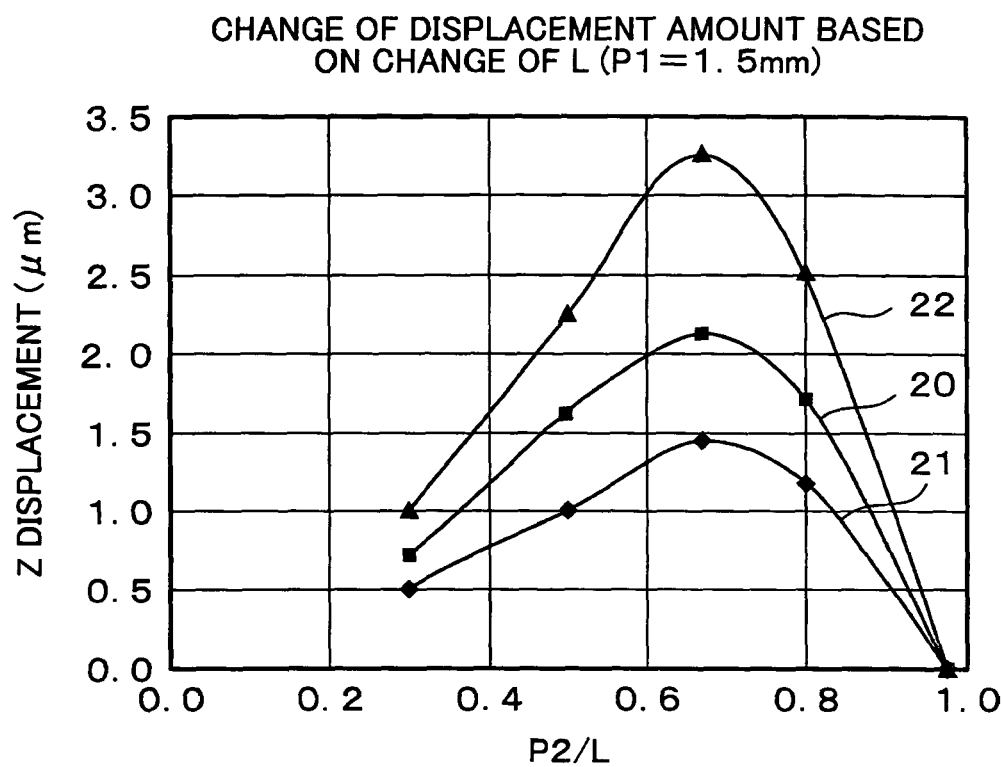
FIG. 11 is a graph showing a change of Z displacement when P2/L of the optical scanning element of the embodiment according to the present invention is changed.

FIG. 11 shows a change of Z displacement under conditions that P1 is set to 1.5 mm and P2/L is changed to a value which falls within a range from 0.3 to approximately 1.0 with respect to respective lengths L of the first beam portion 5a. P2/L is taken on an axis of abscissas and Z displacement which indicates a torsional displacement quantity is taken on an axis of ordinates. A graph 21 indicates a case in which the length L from the connection point to the fixing portion is set to 3 mm, a graph 20 indicates a case in which the length L from the connection point to the fixing portion is set to 5 mm, and a graph 22 indicates a case in which the length L from the connection point to the fixing portion is set to 8 mm. The graph 20 in FIG. 11 is the same as the graph in FIG. 10. With respect to any length L, Z displacement becomes large when P2/L takes a value which falls within a range from 0.5 to 0.8, and Z displacement becomes maximum when P2/L takes a value of approximately 0.67. Further, Z displacement can be increased by setting the length L of the first beam portion 5a to 5 mm rather than 3 mm, and Z displacement can be further increased by setting the length L of the first beam portion 5a to 8 mm rather 5 mm. It is understood that along with the increase of the length L of the beam portion, the amplitude of the longitudinal oscillations becomes is increased and hence, the torsional displacement angle of the mirror supporting portions is increased.

Figure 12:
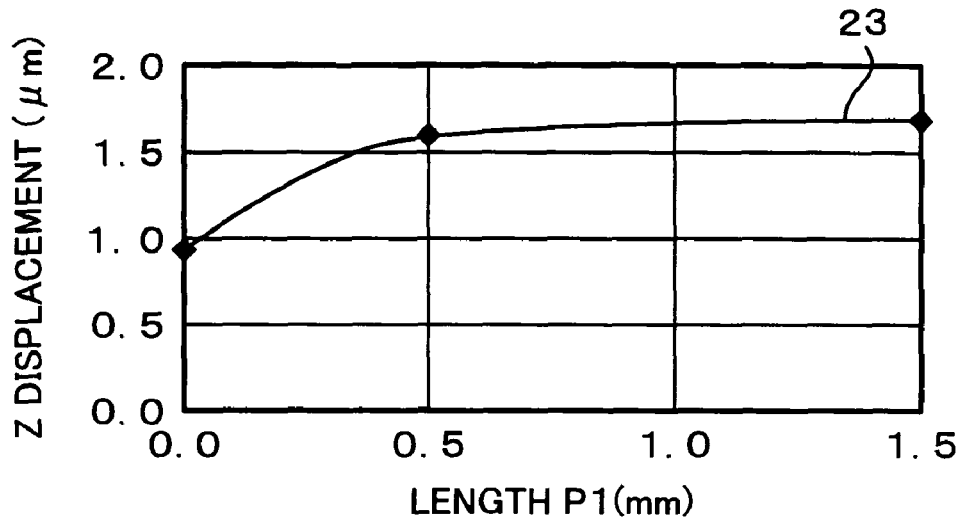
FIG. 12 is a graph showing a change of Z displacement when P1 of the optical scanning element of the embodiment according to the present invention is changed.

FIG. 12 shows a change of Z displacement under conditions that P2 is set to 4 mm and the overlapping length P1 of the first piezoelectric body 12a and the first fixing portion 6a and the overlapping length P1 of the second piezoelectric body 12b and the second fixing portion 6b are changed within a range from 0 mm to 1.5 mm. P1 is taken on an axis of abscissas and Z displacement is taken on an axis of ordinates. A graph 23 indicates that Z displacement is small when P1 is 0, that is, when the piezoelectric body does not overlap with the fixing portion, while Z displacement assumes a maximum displacement quantity and becomes approximately constant when P1 is 0.5 mm or more. Accordingly, it is necessary to fixedly mount the piezoelectric body on the frame portion in a state that the piezoelectric body extends over the beam portion and the fixing portion. This result substantially agrees with the results obtained by the experiments No 1, No 7 to No 9 shown in FIG. 6.

Figure 13:
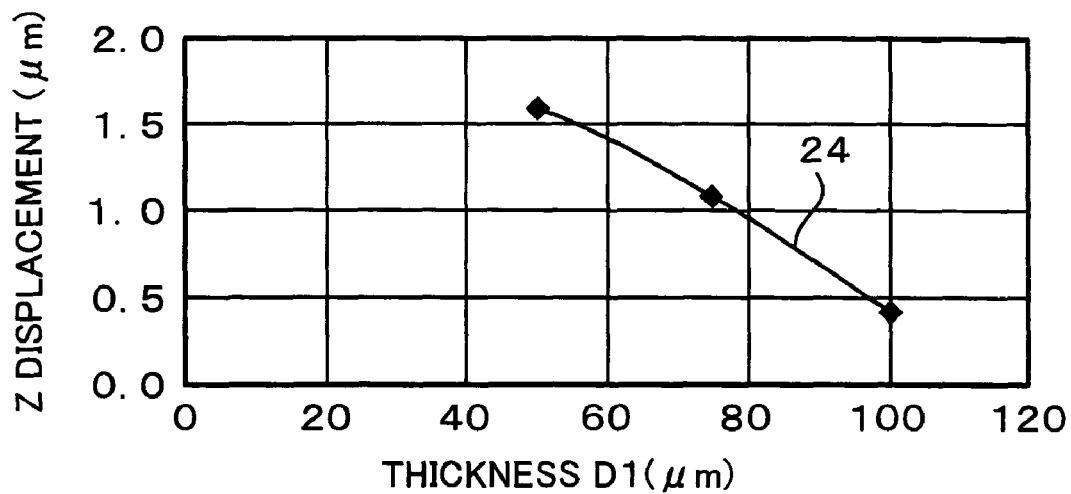
FIG. 13 is a graph showing a change of Z displacement when D1 of the optical scanning element of the embodiment according to the present invention is changed.

FIG. 13 shows a change of Z displacement under conditions that P2/L is set to 0.5 and the thickness of the first beam portion 5a, the thickness of the first fixing portion 6a and the thickness of the second fixing portion 6b of the first member 8 are respectively increased from 50 μm to 100 μm. The thickness D1 is taken on an axis of abscissas and Z displacement is taken on an axis of ordinates. It is understood from a graph 24 that the smaller the thickness of the beam portion and the fixing portion than 100 μm, the larger Z displacement becomes. This result agrees with the result estimated from the experiments No 17, No 1, No 18 and No 19 shown in FIG. 8 in tendency.

Figure 14:
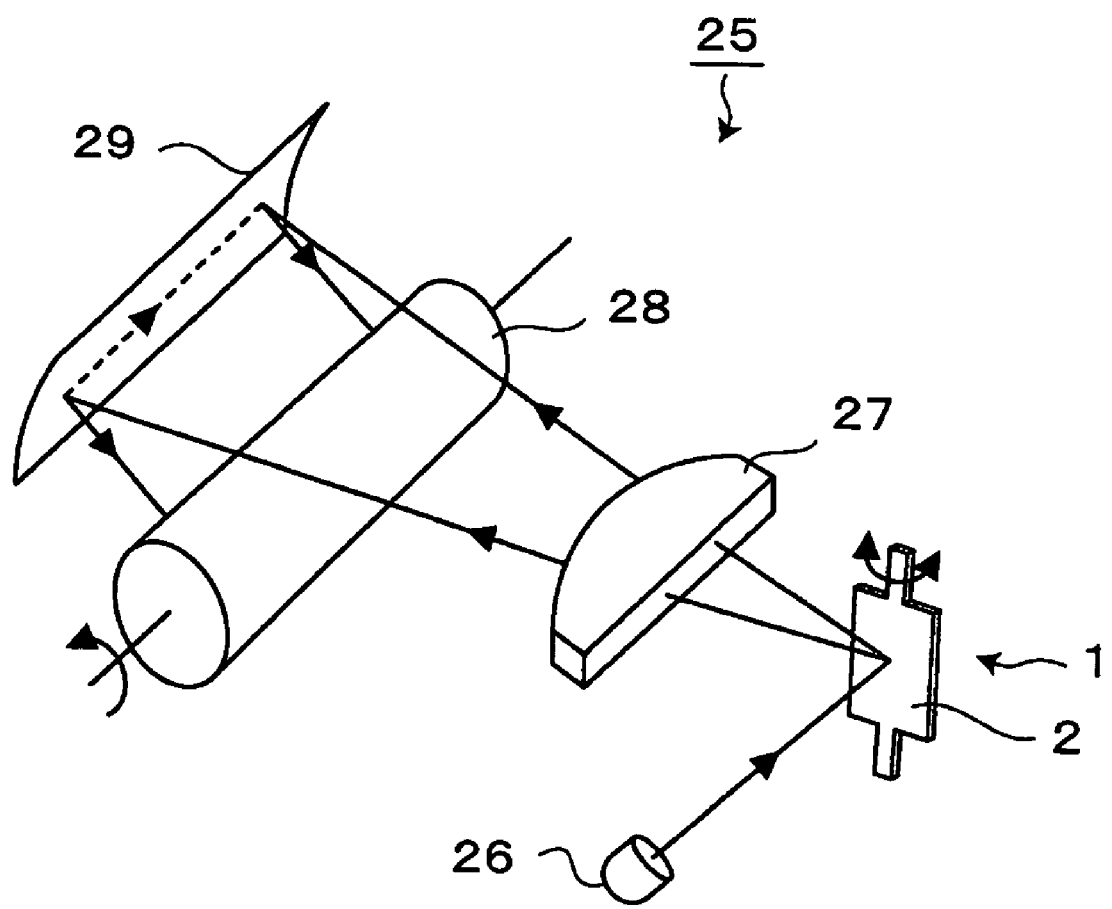
FIG. 14 is a conceptual view of an optical scanning device of an embodiment according to the present invention.

FIG. 14 is a schematic block diagram in which the optical scanning element 1 is used in an optical scanning device 25 used in a laser printer. Identical components or parts having identical functions are given same symbols.

In FIG. 14, a laser light source 26 to which a modulation signal for forming an image is inputted radiates laser beams to the optical scanning element 1. The laser beams which are incident on the mirror portion 2 of the optical scanning element 1 are scanned in a direction orthogonal to the swing axis. The scanned laser beams pass through a Fθ lens 27 and are reflected on a concave mirror 29 and are radiated to a photosensitive body 28 formed on a rotary drum so as to form an electrostatic latent image on the photosensitive body 28. Along with the rotation of the rotary drum, the electrostatic latent image is copied on a copying sheet not shown in the drawing. Here, as such an optical scanning element 1, the optical scanning element 1 explained in conjunction with the above-mentioned FIG. 1 to FIG. 13 is used. Further, the Fθ lens 27 is provided for correcting a scanning speed at which the laser beams scan the photosensitive body 28 formed on a surface of the rotary drum. However, the Fθ lens 27 may be omitted by adjusting the modulation signal and a swinging speed of the mirror portion 2.

Although the embodiment of the optical scanning device 25 used in the laser printer is explained in conjunction with FIG. 14, the optical scanning device is also used in a one-dimensional or two-dimensional barcode reader or the like, and the optical scanning element 1 explained in conjunction with the above-mentioned FIG. 1 to FIG. 13 may be used in this optical scanning device.

Figure 15:
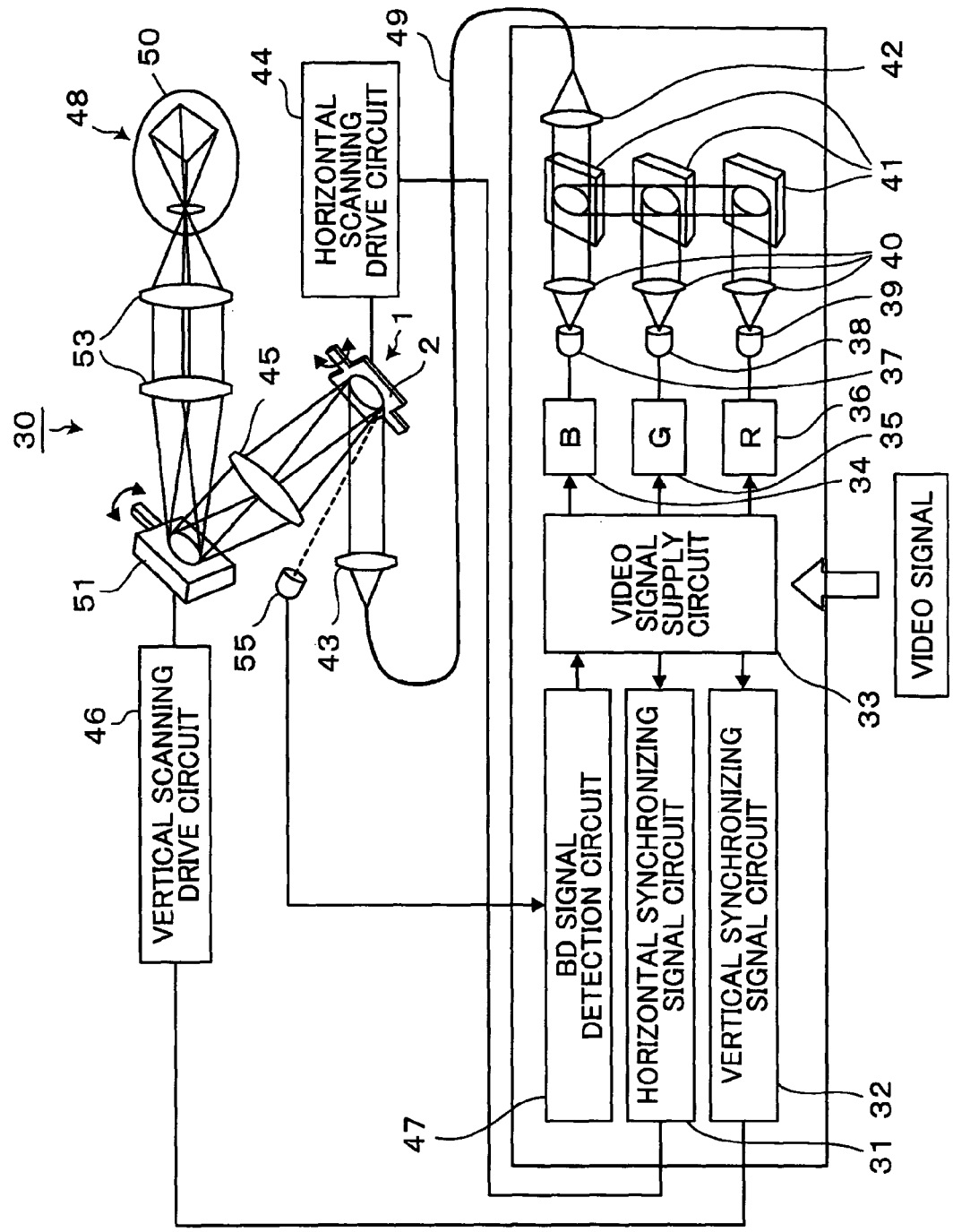
FIG. 15 is a block diagram of a retinal scanning display of an embodiment according to the present invention.
Figure 16:
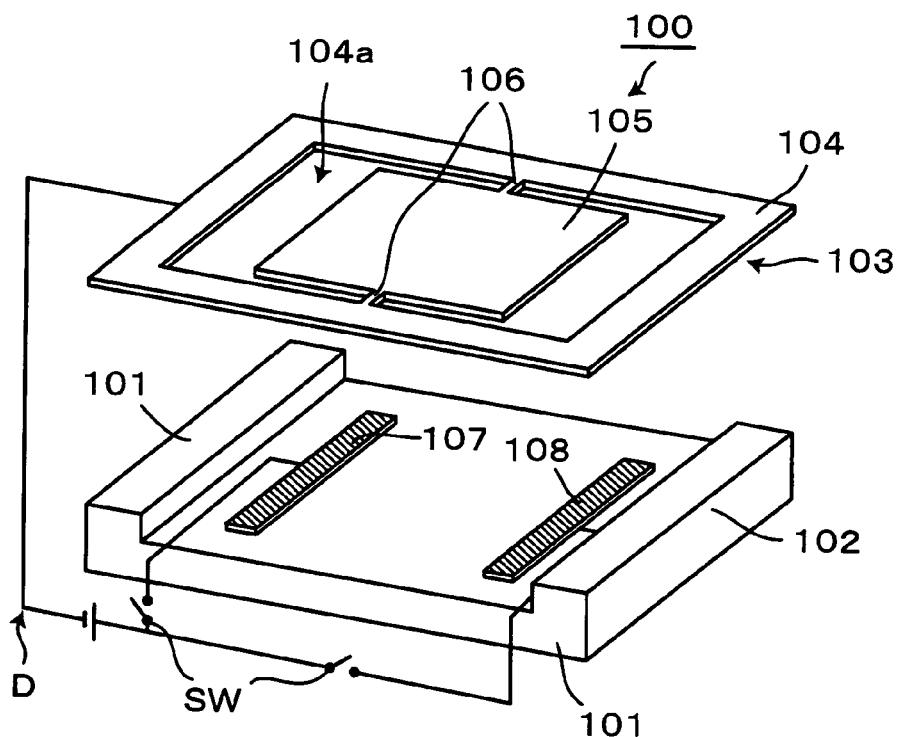
FIG. 16 is a perspective view of a conventional optical scanning element.
Figure 17:
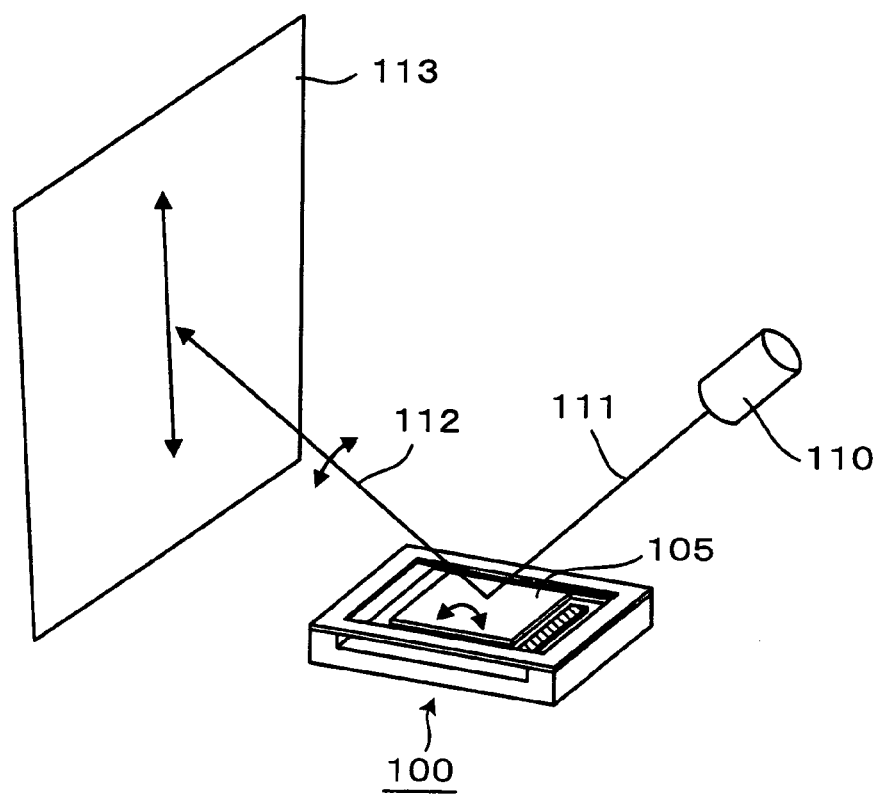
FIG. 17 is an explanatory view showing a state in which the projection is performed using the conventional optical scanning element.

FIG. 15 is a block diagram of a retinal scanning display 30 which uses the above-mentioned optical scanning element 1. Identical components or parts having identical functions are given same symbols.

In FIG. 15, the retinal scanning display 30 directly forms an image on a retina 50 of an eye ball 48 of an observer. Video lights radiated from a B laser 37 which emits blue light, a G laser 38 which emits green light and a R laser 39 which emits red light are collimated into parallel lights by a collimation optical system 40, are synthesized by a dichroic mirror 41, are condensed by a coupling optical system 42, and are introduced into an optical fiber 49. The video lights radiated from the optical fiber 49 are radiated to the mirror portion 2 of the optical scanning element 1 which is explained in conjunction with the above-mentioned FIG. 1 to FIG. 13. The mirror portion 2 is driven by a horizontal scanning drive circuit 44 so that the mirror portion 2 is oscillated in a swinging manner and scans the reflection lights in a horizontal direction. The video lights scanned in the horizontal direction are radiated to a Galvano mirror 51 via a relay optical system 45. A mirror surface of the Galvano mirror 51 is oscillated due to a magnetic field and scans the reflection lights in a vertical direction. The video lights reflected from the Galvano mirror form an image on the retina 50 of the eye ball 48 by a second relay optical system 53.

In response to inputting of the image signal to a video signal supply circuit 33, the video signal supply circuit 33 outputs image signals corresponding to blue (B), green (G) and red (R) to a B laser drive circuit 34, a G laser drive circuit 35 and a R laser drive circuit 36 respectively. The B laser 37 radiates a laser light of blue (B) whose optical intensity is modulated based on a drive signal from the B laser drive circuit 34. In the same manner, the G laser 38 and R laser 39 also radiate laser lights of respective colors whose optical intensities are modulated based on the respective image signals.

The video signal supply circuit 33 outputs a synchronizing signal which is synchronized with the image signal to the horizontal scanning drive circuit 44 and the vertical scanning drive circuit 46. The horizontal synchronizing signal circuit 31 outputs a horizontal synchronizing signal to the horizontal scanning drive circuit 44, while the vertical synchronizing signal circuit 32 outputs a vertical synchronizing signal to the vertical scanning drive circuit 46. The horizontal scanning drive circuit 44 outputs a drive signal to the optical scanning element 1 so as to oscillate the mirror portion 2 in a swinging manner. Such swinging is based on resonance oscillations of the mirror portion 2. A photo sensor 55 receives a portion of light scanned in the horizontal direction by the horizontal scanning drive circuit 44, converts the portion of light into an electric signal and outputs the electric signal to a BD signal detection circuit 47. The BD signal detection circuit 47 detects timing of the horizontal scanning and outputs a timing signal to the video signal supply circuit 33, and the video signal supply circuit 33 accurately determines start timing of the video signal based on the inputted timing signal.

In the above-mentioned retina scanning display 30, the vertical scanning is performed using the Galvano mirror 51. However, the vertical scanning may be performed using the above-mentioned optical scanning element 1. In this case, a frequency for vertical scanning may be low, that is, approximately 60 Hz, for example. Accordingly, swinging of a mirror portion may be performed by a torsional angle control based on an electric signal without using resonance oscillations.

In FIG. 15, the explanation has been made with respect to the example in which the optical scanning element 1 is applied to the retinal scanning display. However, by changing the second relay optical system 53 with a projection lens system and by using a projection screen or a wall of a building in place of the eyeball 48, the present invention is also applicable to a projection-type optical scanning display device. Although the optical scanning display device explained in conjunction with the embodiment shown in FIG. 15 is an RGB full-color display device, it is possible to acquire an optical scanning display device for a large screen which scans laser beams of one or two color radiated from a laser beam source.

The optical scanning element, the optical scanning display device and the retinal scanning display of the present invention are applicable to the technical field in which the reflection mirror is swung using the oscillating body, laser beams modulated in response to video signals or the like are radiated to the swinging reflection mirror, and the image is formed using scanned laser beams reflected from the reflection mirror.

What is claimed is:

1. An optical scanning element being configured to scan an incident optical flux by a swingable reflection surface, the optical scanning element comprising:
   a first member which is constituted of a mirror portion which has the reflection surface, a mirror supporting portion which is connected to the mirror portion and forms a swing axis which is configured to allow the mirror portion to generate swinging thereof by a torsional displacement thereof, and a frame portion which is connected to the mirror supporting portion and is configured to allow the mirror supporting portion to generate a torsional displacement by oscillations thereof;
   a second member which fixes and holds the frame portion of the first member thereon; and
   a piezoelectric body which is fixedly mounted on the frame portion of the first member and is configured to transmit oscillations to the frame portion, wherein
   the frame portion includes a beam portion and fixing portions which are positioned at both ends of the beam portion,
   the mirror supporting portion is connected to the beam portion at a connection point,
   the frame portion is fixed to the second member at the fixing portions, and
   the piezoelectric body is fixedly mounted on the frame portion in a state that the piezoelectric body extends toward the connection point of the beam portion from the fixing portion to a position not over the connection point thus extending over the beam portion and the fixing portion.

2. An optical scanning element according to claim 1, wherein the piezoelectric body is fixedly mounted on the frame portion in a state that the piezoelectric body extends toward the connection point of the beam portion from the fixing portion to a position where an overlapping length of the piezoelectric body and the beam portion does not exceed 80% of a length of the beam portion between the fixing portion and the connection point.

3. An optical scanning element according to claim 1, wherein the piezoelectric body is fixedly mounted on the frame portion in a state that the piezoelectric body extends toward the connection point of the beam portion from the fixing portion to a position where an overlapping length of the piezoelectric body and the beam portion does not fall below 50% of a length of the beam portion between the fixing portion and the connection point.

4. An optical scanning element according to claim 1, wherein the piezoelectric body is fixedly mounted on the frame portion in a state that the piezoelectric body extends toward the connection point of the beam portion from the fixing portion to a position where an overlapping length of the piezoelectric body and the beam portion falls within a range from 50% to 70% of a length of the beam portion between the fixing portion and the connection point.

5. An optical scanning element according to claim 1, wherein the piezoelectric body is fixedly mounted on the beam portion in a state that an area of a region of the piezoelectric body occupies 40% to 80% of an area of a region of the beam portion between the fixing portion and the connection point.

6. An optical scanning element according to claim 1, wherein the frame portion is arranged to surround the mirror portion.

7. An optical scanning element according to claim 1, wherein the piezoelectric body is fixedly mounted on the frame portion in a state that the piezoelectric body extends over the beam portion and at least one of the fixing portions at both ends of the beam portion.

8. An optical scanning element according to claim 1, wherein the piezoelectric body is fixedly mounted on the frame portion in a state that the piezoelectric body extends over the beam portion and the fixing portions at both ends of the beam portion.

9. An optical scanning device which is configured to scan an optical flux modulated in response to an image signal by an optical scanning element, wherein
the optical scanning element comprises:
a first member which is constituted of a mirror portion which has the reflection surface, a mirror supporting portion which is connected to the mirror portion and forms a swing axis which is configured to allow the mirror portion to generate swinging thereof by a torsional displacement thereof, and a frame portion which is connected to the mirror supporting portion and is configured to allow the mirror supporting portion to generate a torsional displacement by oscillations thereof;
a second member which fixes and holds the frame portion of the first member thereon; and
a piezoelectric body which is fixedly mounted on the frame portion of the first member and is configured to transmit oscillations to the frame portion, wherein
the frame portion includes a beam portion and fixing portions which are positioned at both ends of the beam portion,
the mirror supporting portion is connected to the beam portion at a connection point,
the frame portion is fixed to the second member at the fixing portions, and
the piezoelectric body is fixedly mounted on the frame portion in a state that the piezoelectric body extends toward the connection point of the beam portion from the fixing portion to a position not over the connection point thus extending over the beam portion and the fixing portion.

10. An optical scanning display device which is configured to scan an optical flux modulated in response to an image signal by an optical scanning element so as to perform a projection, wherein the optical scanning element comprises:
a first member which is constituted of a mirror portion which has the reflection surface, a mirror supporting portion which is connected to the mirror portion and forms a swing axis which is configured to allow the mirror portion to generate swinging thereof by a torsional displacement thereof, and a frame portion which is connected to the mirror supporting portion and is configured to allow the mirror supporting portion to generate a torsional displacement by oscillations thereof;
a second member which fixes and holds the frame portion of the first member thereon; and
a piezoelectric body which is fixedly mounted on the frame portion of the first member and is configured to transmit oscillations to the frame portion, wherein
the frame portion includes a beam portion and fixing portions which are positioned at both ends of the beam portion,
the mirror supporting portion is connected to the beam portion at a connection point,
the frame portion is fixed to the second member at the fixing portions, and
the piezoelectric body is fixedly mounted on the frame portion in a state that the piezoelectric body extends toward the connection point of the beam portion from the fixing portion to a position not over the connection point thus extending over the beam portion and the fixing portion.

11. A retinal scanning display which is configured to scan an optical flux modulated in response to an image signal by an optical scanning element so as to perform a projection display on a retina, wherein
the optical scanning element comprises:
a first member which is constituted of a mirror portion which has the reflection surface, a mirror supporting portion which is connected to the mirror portion and forms a swing axis which is configured to allow the mirror portion to generate swinging thereof by a torsional displacement thereof, and a frame portion which is connected to the mirror supporting portion and is configured to allow the mirror supporting portion to generate a torsional displacement by oscillations thereof;
a second member which fixes and holds the frame portion of the first member thereon; and
a piezoelectric body which is fixedly mounted on the frame portion of the first member and is configured to transmit oscillations to the frame portion, wherein
the frame portion includes a beam portion and fixing portions which are positioned at both ends of the beam portion,
the mirror supporting portion is connected to the beam portion at a connection point,
the frame portion is fixed to the second member at the fixing portions, and
the piezoelectric body is fixedly mounted on the frame portion in a state that the piezoelectric body extends toward the connection point of the beam portion from the fixing portion to a position not over the connection point thus extending over the beam portion and the fixing portion.

* * * * *